United States Patent [19]
Bentgen et al.

[11] Patent Number: 6,139,248
[45] Date of Patent: *Oct. 31, 2000

[54] MODULE TRANSPORTER

[75] Inventors: Bernard F. Bentgen, Marinette, Wis.; William J. Fallon, Menominee, Mich.

[73] Assignee: Marinette Marine Corporation, Marinette, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,675

[22] Filed: Jun. 21, 1996

[51] Int. Cl.$^7$ ........................................................ B60P 1/64
[52] U.S. Cl. ........................ 414/495; 414/458; 280/704
[58] Field of Search ..................... 414/458, 495, 414/482–485; 280/6.12, 840, 704

[56] References Cited

U.S. PATENT DOCUMENTS

| | | | |
|---|---|---|---|
| 3,424,325 | 1/1969 | Kaltenegger | 414/458 |
| 3,442,409 | 5/1969 | Larson | 414/495 |
| 3,792,789 | 2/1974 | Oehler | 414/458 |
| 4,050,707 | 9/1977 | Glumae | 414/495 X |
| 4,053,072 | 10/1977 | Ross et al. | 414/495 |
| 4,556,356 | 12/1985 | Niva | 414/458 |
| 4,619,578 | 10/1986 | Routledge | 414/458 X |
| 4,900,055 | 2/1990 | Wright | 280/704 |
| 5,074,733 | 12/1991 | Hennig | 414/495 X |

OTHER PUBLICATIONS

Emmert International Brochure #1 & Related Photos.
Emmert International Brochure #2.
Emmert International Brochure #3.
2 Photos of Ship Transporter.
5 Photos of Tuning Fork Transporter.
Scheuerle Transport Brochure.

*Primary Examiner*—Gregory A. Morse
*Attorney, Agent, or Firm*—Niro, Scavone, Haller & Niro

[57] ABSTRACT

A module transporter for transporting large loads, such as loads of 100 tons or even more, including two frame members joined at a base. The frame members are vertically adjustable and supported by movable carriages. The base is rotatably connected to the motivator, and the height of the base is also vertically adjustable. The transporter is preferably powered by a motivator with relatively low horsepower that requires little or no turning radius.

21 Claims, 10 Drawing Sheets

MODULE TRANSPORTER

BACKGROUND OF THE INVENTION

This invention is generally directed to a module transporter. More specifically, the invention is directed to a transporter for use in moving large loads, such as portions of ships, whose height may be regulated and which is powered by a motivator with a small turning radius.

Figure 1:
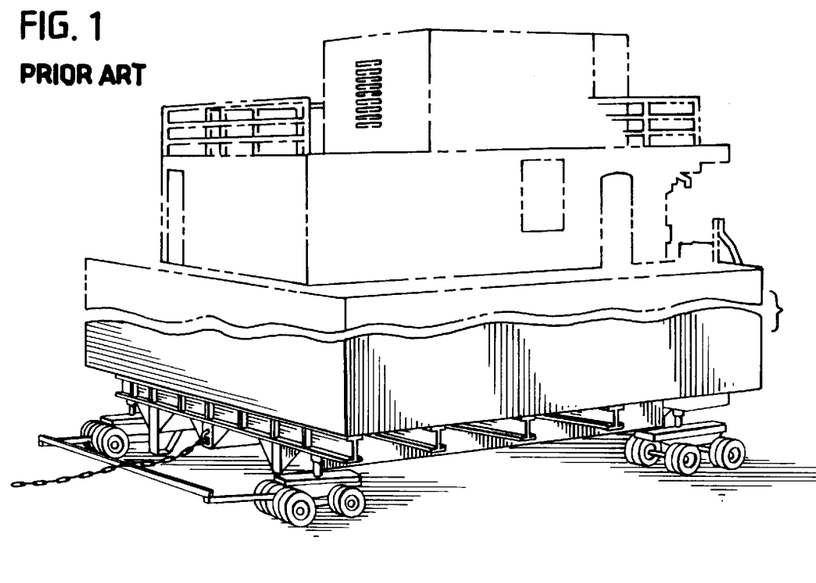
FIG. 1 is a perspective view of a prior art transporter that included a large frame carried by manually steerable wheeled carts.

In order to transport large loads, such as the bow, deckhouse or other portions of ships, from the manufacturing facility to the erection site for their ultimate connection, a large frame mounted to a series of wheeled carts has been used. Each wheeled cart typically included a set of steerable wheels, as shown in FIG. 1. Forward and rearward pairs of wheeled carts are connected by chain falls or "tug-its" to accomplish manual steering. The entire frame can be pushed forward using a separately powered vehicle.

Such conventional transporter frames, however, do not permit the operator to raise or lower the load during transport. This is often necessary due to uneven terrain. Conventional transporters are also characteristically time-consuming to set up and operate.

Movable hydraulic dollies have also been used. While such dollies permit the load to be raised or lowered while stationary, they are not easily positioned, and require time to do so. Nonmovable jack dolleys have also been used to support large loads in elevated positions. Finally, while some large loading dollies have been capable of both horizontal and vertical positioning, these dollies are not easily steered. Also, vertical or horizontal movement is not easily accomplished with such devices, and cannot be performed in a relatively short amount of time.

Figure 2A:
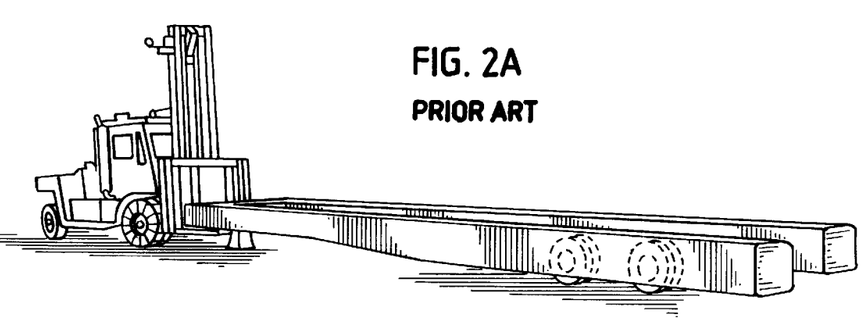
FIGS. 2A and 2B are perspective and side views, respectively, of the prior art "tuning fork" transporter design developed by the assignee of the present invention.
Figure 2B:
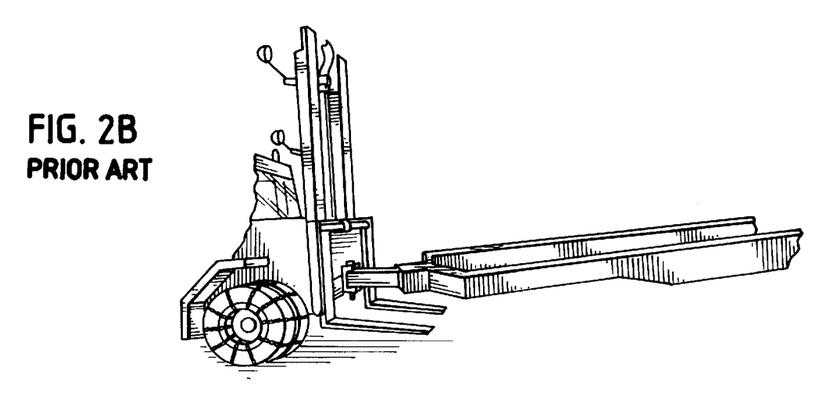

To overcome some of the deficiencies in the prior art, the assignee of the present invention developed a "tuning fork" transporter frame design, shown in FIGS. 2A and 2B. This transporter frame consists of two parallel, wheeled "forks" joined by a forwardly positioned yoke. The yoke is pivotally connected to a base portion of the front of a conventional fork lift, as shown. The fork lift raises and lowers the yoke. Rear fork portions are each mounted to a pair of wheels on a cart, and a hydraulic cylinder linkage is associated with each cart. The cylinder linkage, connected in parallel to a common hydraulic pump, permits the rear fork portions to be jointly raised or lowered. However, each of the two rear fork lift points cannot be independently raised and lowered.

While the tuning fork transporter design is an improvement over the prior art, there are still disadvantages associated with it. For example, it requires a relatively large turning radius. Also, a three-lift-point design in which each lift point can be independently raised and lowered would provide the transporter with enhanced maneuverability. Further, the tuning fork design cannot be used with loads of more than about 20 tons, due to limitations in the fork-lift lifting and pulling abilities, and due to strength limitations in the "tuning fork" structure.

SUMMARY OF THE INVENTION

The present invention preserves the advantages of known module transporters. In addition, it provides new advantages not found in known transporters, and overcomes many of the disadvantages of such currently available devices, including those discussed immediately above.

The invention is generally directed to a low-profile, regulating transporter for conveying a load, and includes a support structure for supporting and transporting the load. The support structure has at least two longitudinally extending frame members joined at a base. At least one movable carriage is associated with each frame member and is positioned at a distance from the base. The movable carriages permit associated ends of the frame members to be vertically movable between raised and lowered positions. A powered motivator is preferably used to move the transporter in a horizontal direction. The motivator supports and is rotatably connected to the base. The base can be raised or lowered during transport independent of the vertical movement of the frame members permitted by the movable carriages, thereby allowing the load to be maintained in a substantially level condition (so as to prevent the load from tipping or displacing, for example) during transport. Also, the motivator is capable of moving the support structure in any horizontal direction by first rotating the motivator about a generally vertical axis passing through a portion of the motivator. In one embodiment, a main cylinder mounted to the motivator supports the base and provides the rotatable connection.

In a particularly preferred embodiment, the top surface of each frame member is about three feet or less above ground level in the lowered position. As one example, the transporter is designed to carry loads in excess of 100 tons, and the motivator is powered by a motor of less than about 100 horsepower. In a preferred embodiment, the transporter has a horsepower-to-weight ratio of about 0.5. In another preferred embodiment, the transporter has a horsepower-to-weight ratio of less than about one.

In a preferred embodiment, the motivator is a tractor with endless metal belts or, alternatively, a wheeled tractor. Preferably, the tractor engine is displaced to one end of the tractor generally opposite the tractor end connected to the base. Hydraulic actuators, connected between the frame members and the movable carriages, can be used to power the vertical movement of the frame members, relative to the movable carriages, between the raised and lowered positions. The hydraulic system of the tractor can be used to power the hydraulic actuators. Rotatable plates can be used to link the hydraulic actuators to the movable carriages.

In the preferred embodiment, the base lies in a generally horizontal plane which is elevated relative to the horizontal plane containing an upper surface of the frame members. Preferably, the frame members are designed to be disassembled from at least portions of the base, and the base and main cylinder are also designed to be disassembled from the motivator, to facilitate shipment of the transporter.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DESCRIPTION OF THE PREFERRED EMBODIMENTS

Figure 3:
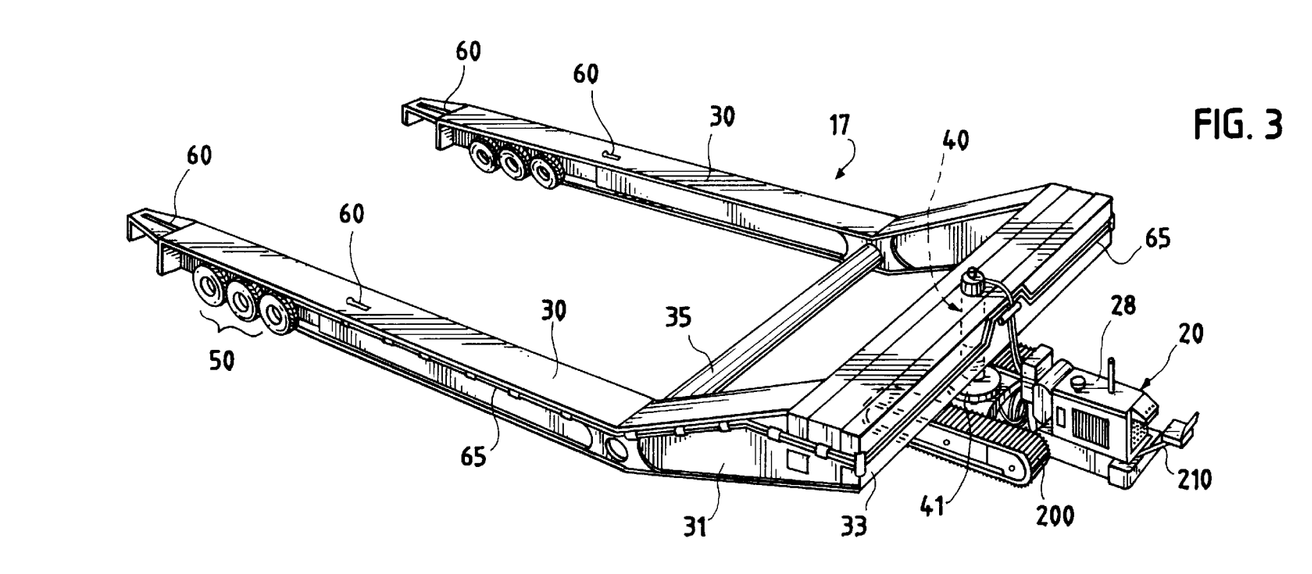
FIG. 3 is a perspective view of a preferred embodiment of the module transporter of the present invention.

Referring now to FIG. 3, a preferred embodiment of the transporter of the present invention is shown, and designated generally as 15. In the preferred embodiment shown here, transporter 15 is designed to transport large loads such as portions of ships ("modules"), and generally includes a support structure 17 and a self-powered, self-propelled motivator 20.

Figure 4:
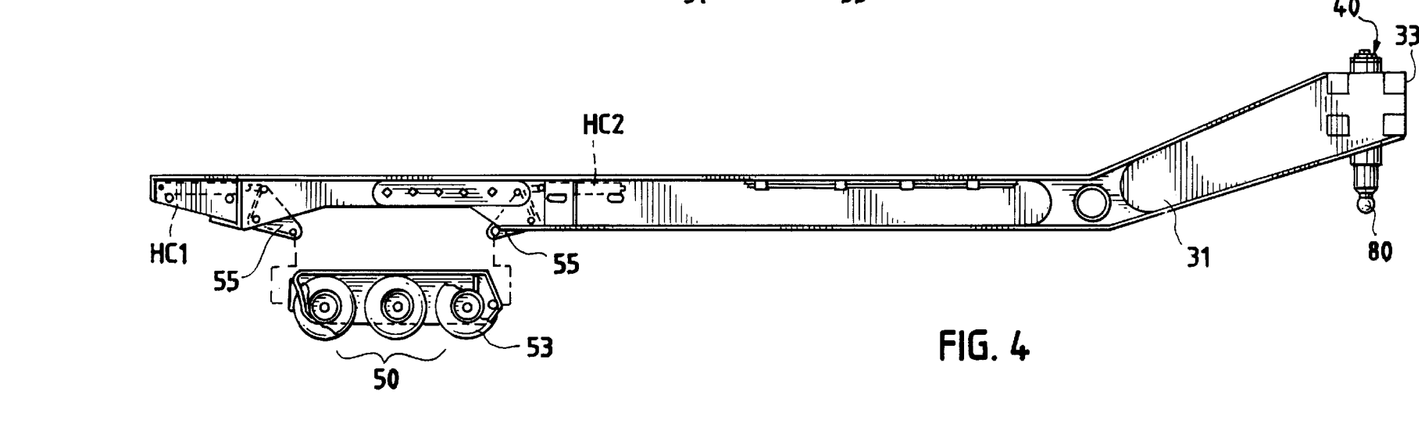
FIG. 4 is a side view of the transporter of the present invention.
Figure 5:
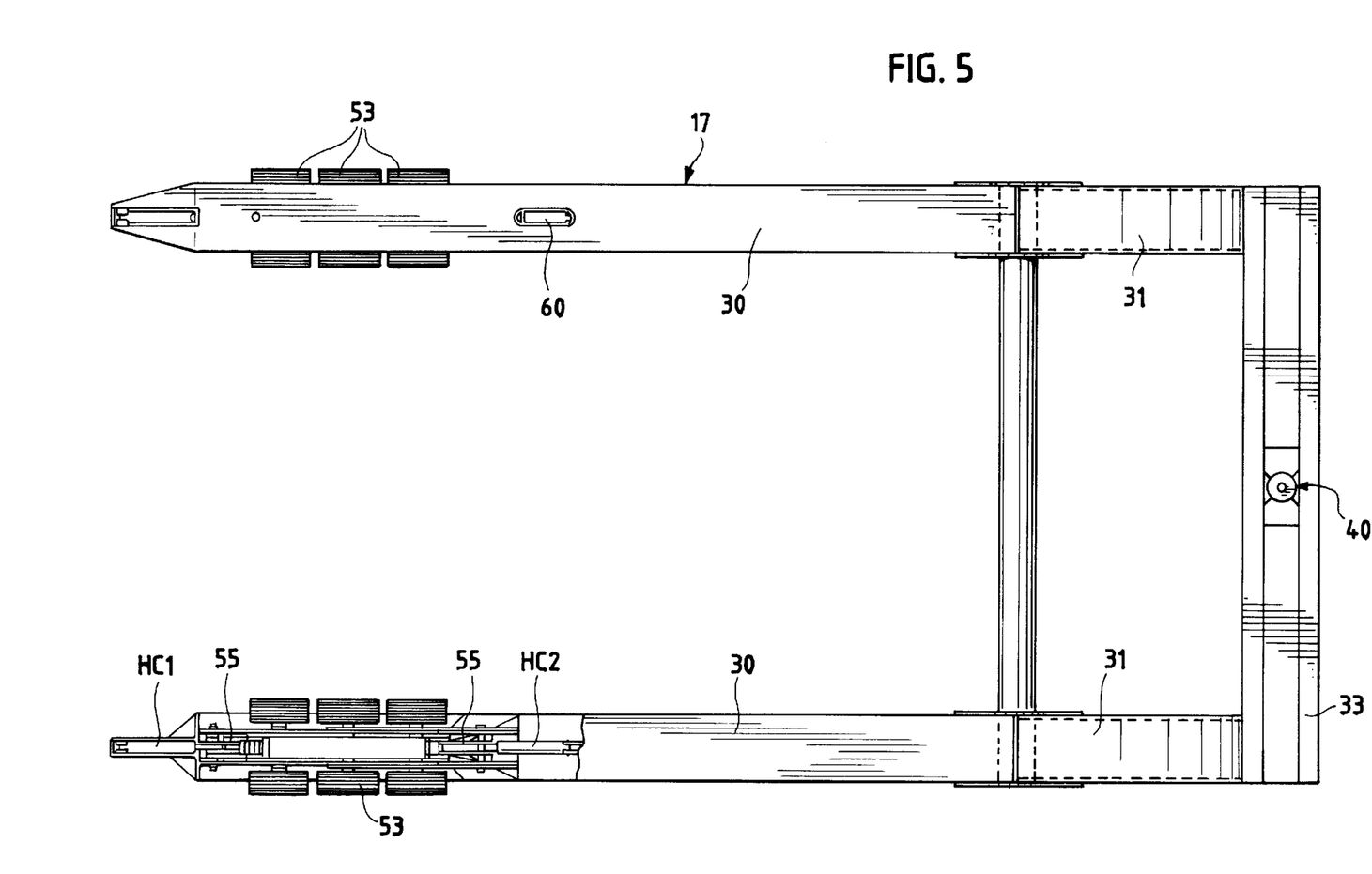
FIG. 5 is a partial plan view, in partial cross-section, of the transporter.
Figure 6:
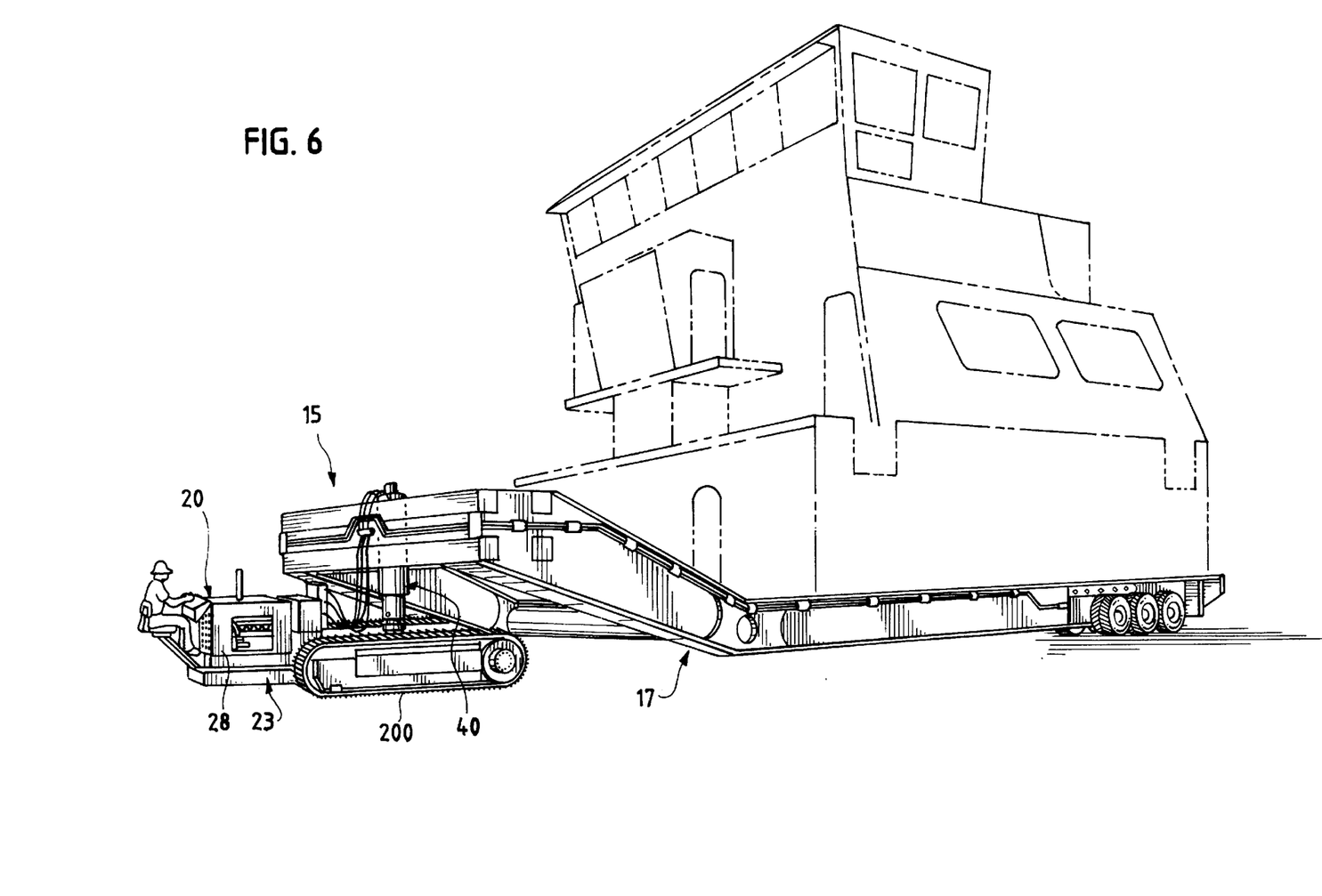
FIG. 6 is a rear perspective view of the transporter, shown carrying a ship deckhouse, and powered by one embodiment of the motivator of the present invention.
Figure 7:
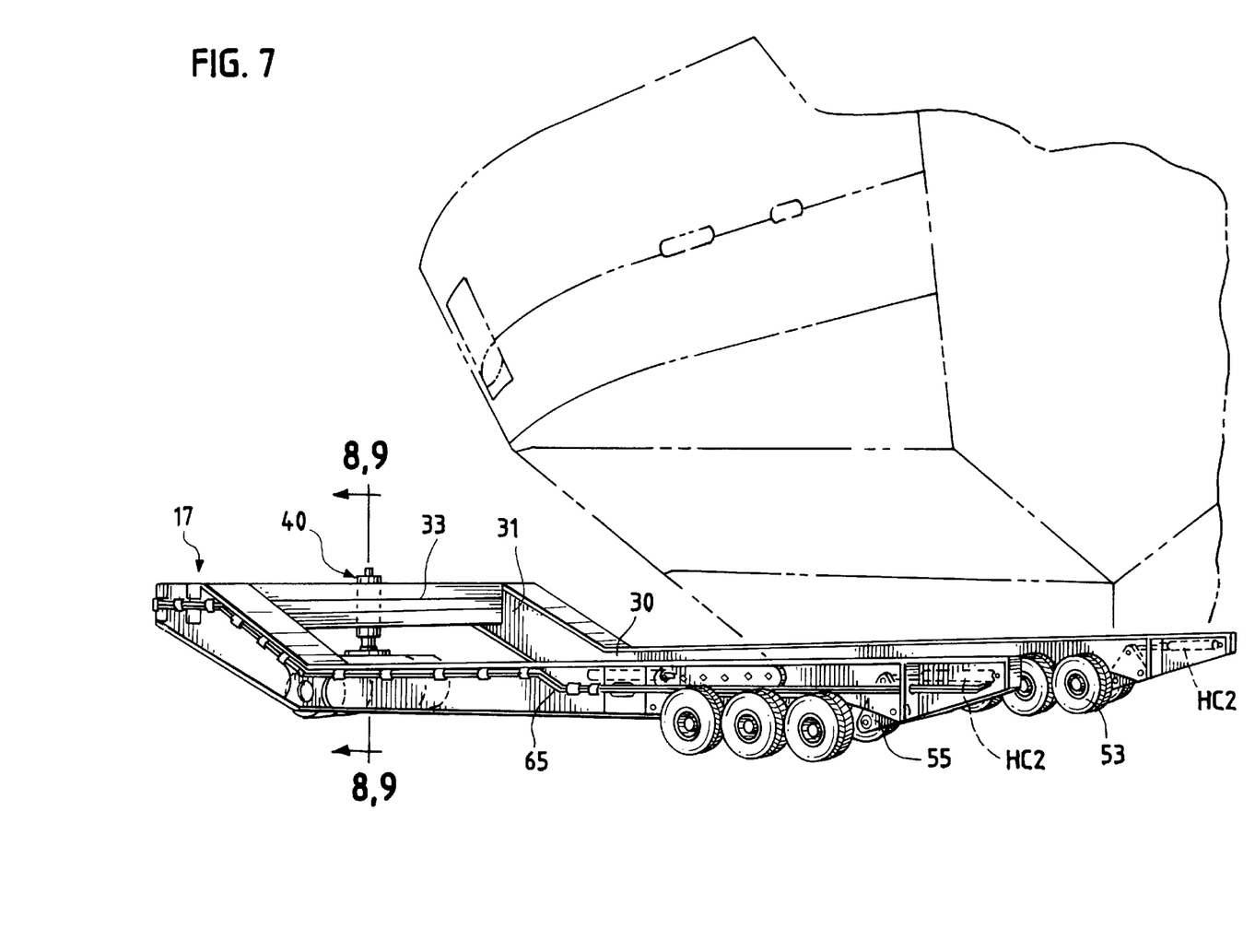
FIG. 7 is a side perspective view of the transporter, shown carrying a ship bow.

More specifically, and referring now to FIGS. 3 and 4, support structure 17 of module transporter 15 includes at least two longitudinally-extending frame members or "forks" 30 with elevated portions 31 connected to a transverse base 33. A second transverse support, such as pipe 35, can also be used to further connect and to provide transverse rigidity to frame members 30, as shown in FIG. 3. Base 33 is mounted to motivator 20 through main cylinder 40, in the manner explained below. Support structure 17 should be sized and designed to safely carry the desired loads. Support structure 17 shown in the drawings, for example, is approximately 58 feet long and 28 feet wide, weighs about 25-30 tons, and is designed to transport loads of about 110-120 tons (for a total load of 150 tons), as shown in FIGS. 6 and 7. (For moving the deckhouse or ship bow shown in those drawings, strongbacks (not shown) would preferably be positioned under the load to provide further support.) Motivator 20 moves support structure 17 by pulling it in the desired forward direction, or pushing it in the desired rearward direction, as explained below. (As used here, and referring to FIG. 6, the term "forward" means in a direction from support structure 17 and toward the operator of the motivator.) Referring to FIGS. 4, 5, 10 and 11, frame members 30 are supported by one or more wheeled carriages or "bogeys" 50 including wheels 53. Alternatively, carriages 50 can take alternative forms than that shown in the drawings, such as being movable on tracks or endless belts. Hydraulic cylinders HC1 and HC2 are pin-connected at their cylinder end to frame member 30 and at their piston rod end to rotatable triangular linkage plates 55 at pivot points 55A. Elongated, reinforced steel plate 150 provides added strength to frame member 30, since this is an area in which the loads are high and the frame member is necessarily narrower to accommodate the wheel frame. Diamond-shaped or circular-shaped cut-outs 152 can be used to provide a greater weld surface area, facilitating the connection of plate 150 to frame member 30. Linkage plates 55 are pivotally connected to wheel frame 140 at pivot points 56A. Apertures 60 in frame members 30 allow access to the hydraulic cylinders for installation and maintenance. Hydraulic lines 65 carry hydraulic fluid from the hydraulic system of motivator 20 to hydraulic cylinders HC1 and HC2. Triangular linkage plates 55 are pivotally connected to frame member 30 so that when the piston rods are extended by the hydraulic cylinders, plates 55 will rotate in the direction of the arrows shown in FIG. 11, causing frame members 30 to be moved vertically upward as shown. Of course, one hydraulic cylinder can be actuated without actuating the other, so that the frame member can be placed in an angled inclination, if desired.

Figure 10:
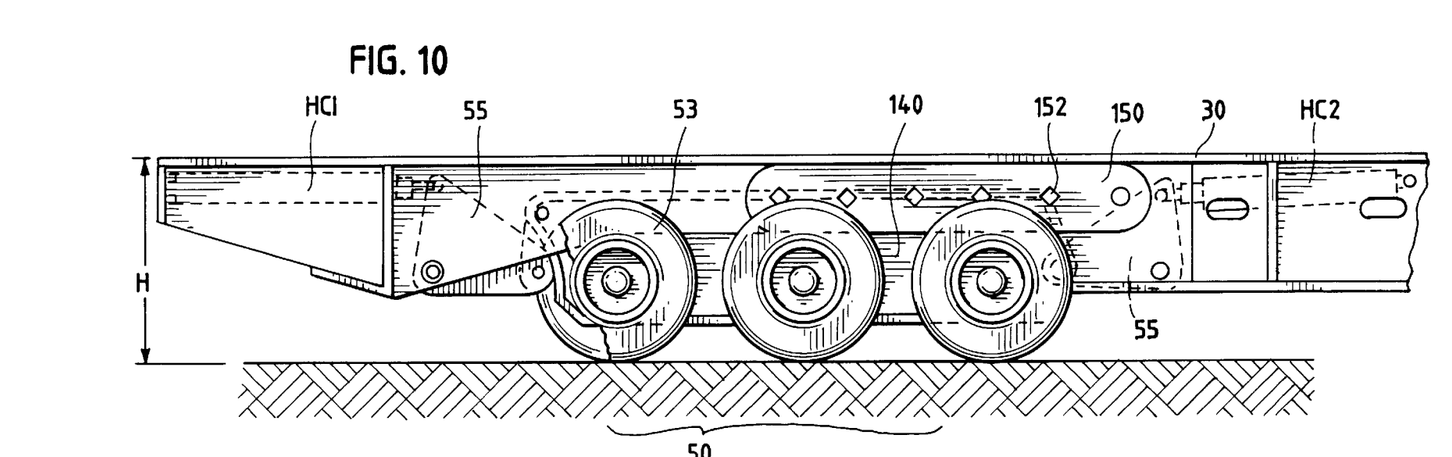
FIGS. 10 and 11 are partial side views of one of the frame members of the present invention, illustrating vertical movement of the wheeled carriages.
Figure 11:
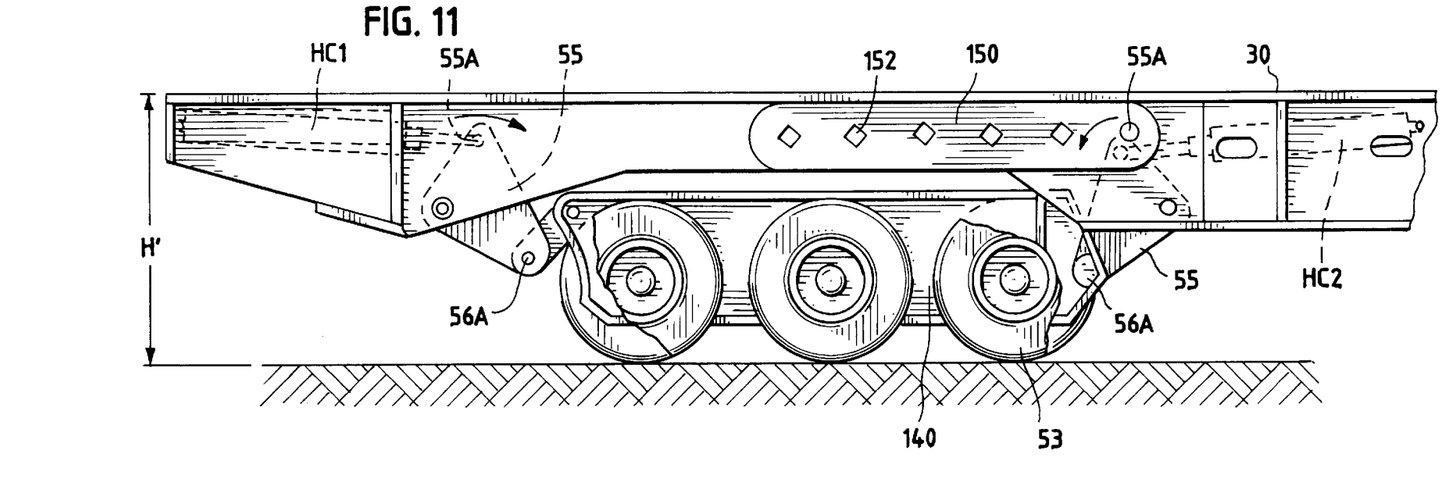

In the preferred embodiment, hydraulic cylinders HC1 and HC2 share a common hydraulic line, thus keeping the hydraulic pressure equal at all times in each cylinder pair. This permits carriages 50 to rotate about the transverse axis relative to frame member 30 when traversing uneven ground, preventing all of the load from being placed on a single pair of wheels of a carriage 50.

Figure 8:
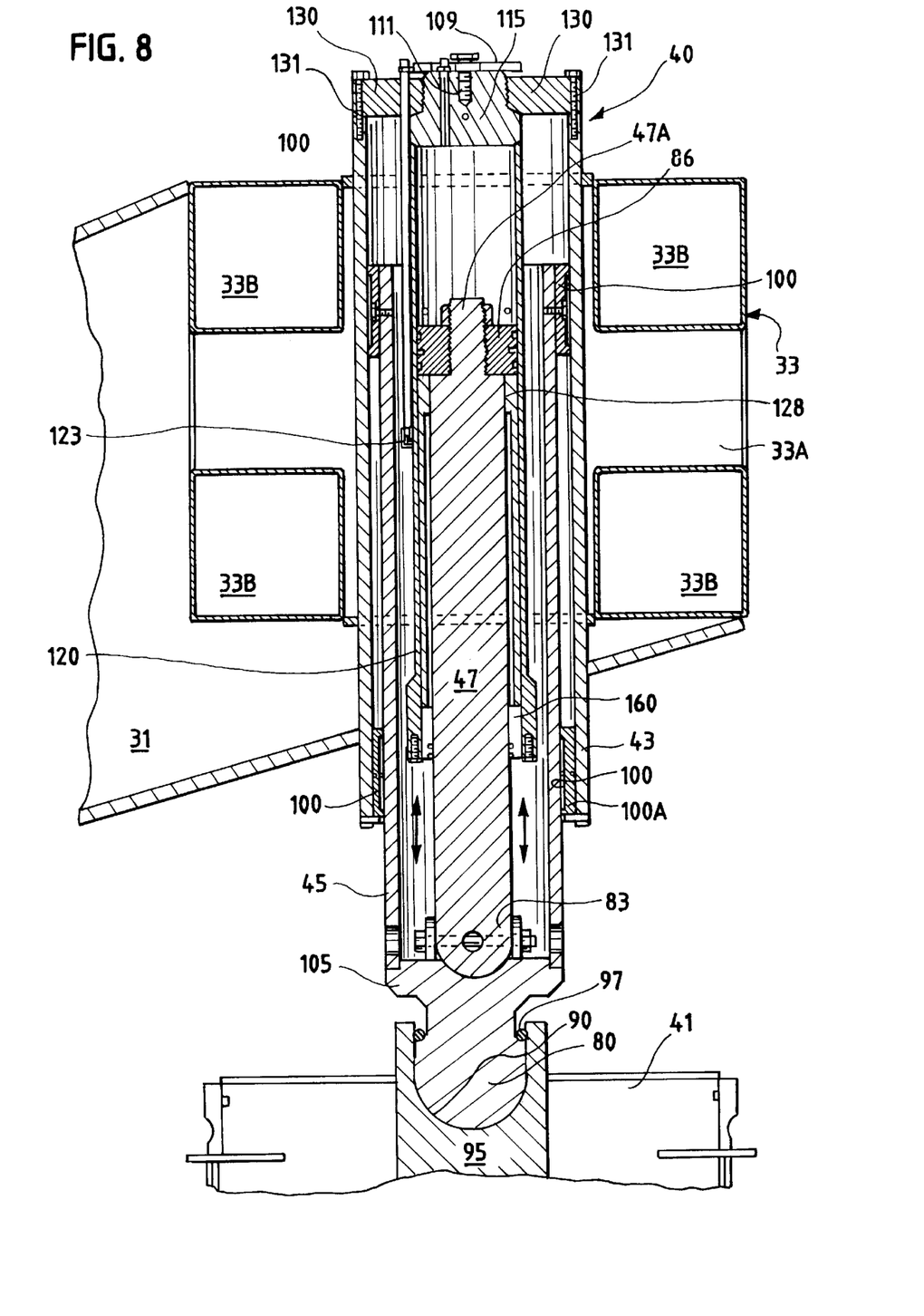
FIG. 8 is a side cross-sectional view, taken along section lines 8—8 and 9—9 of FIG. 7, of the base portion of the support structure cross-beam and the main cylinder, showing the center rod in an extended position.
Figure 9:
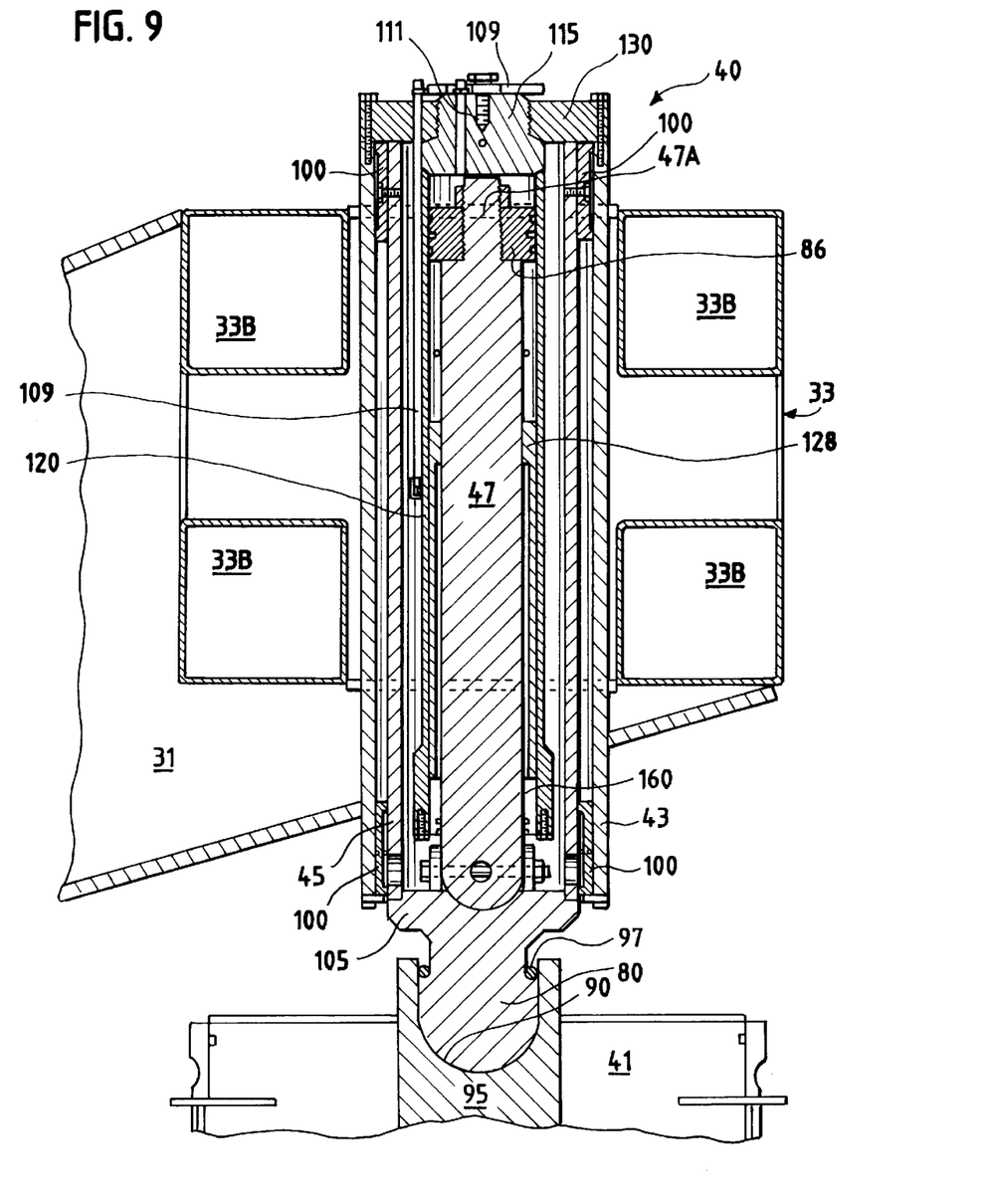
FIG. 9 is a view similar to FIG. 8 showing the center rod in a retracted position.

Referring now to FIGS. 8 and 9, a description of the main cylinder, generally designated as 40, now follows. Generally, main cylinder 40 consists of telescoping tubes or cylinders, with the outer cylinder fixed to the support structure and the inner cylinder attached to the motivator undercarriage using a spherical, load-bearing ball.

Figure 12:
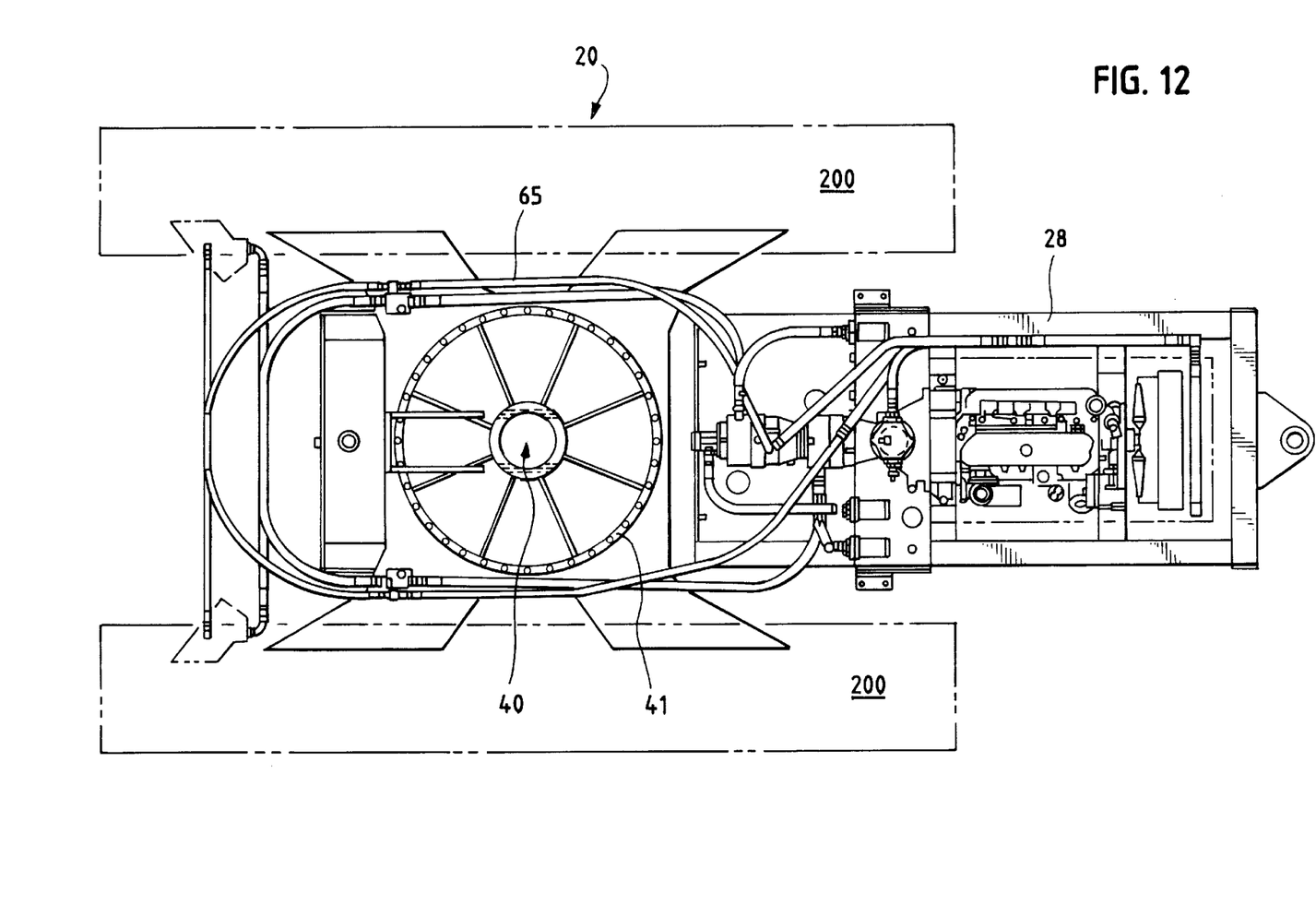
FIG. 12 is a partial plan view of the motivator shown in FIG. 6.

More specifically, main cylinder 40 is attached to frame member 41 (in a manner explained below). Frame member 41 is rigidly connected to and forms a rearward portion of the the undercarriage 23 of motivator 20, as shown in FIG. 12. When the transporter is carrying a load, the motivator is permitted to pivot about main cylinder 40, as will now be explained.

Main cylinder 40 also includes movable outer cylinder 43, and fixed inner cylinder 45. Inner cylinder 45 is rigidly connected to the upper portion 105 of ball 80. Ball 80 is connected within socket 90 of pedestal 95. (Pedestal 95 is rigidly connected to frame member 41 of motivator 20, as also shown in FIG. 12). The ball-and-socket joint, including steel U-clip 97, which prevents ball 80 from lifting out of socket 90, permits the upper cylinder assembly to rotate within socket 90 about the vertical and horizontal axes of pedestal 95.

Still referring to FIGS. 8 and 9, main cylinder 40 also includes large center rod 47, which is rigidly attached at its lower end to upper portion 105 of ball 80 using bolt 83. The narrowed upper portion 47A of rod 47 is threadably attached within upper hydraulic sleeve 86, which seals off hydraulic fluid from flowing around its sides. Bolt 111 attaches retaining plate 109 to hydraulic cylinder end-cap 115; cylinder end-cap 115 is rigidly connected to rod sleeve 120. An outer cylinder end-cap 130 is rigidly attached to outer cylinder 43 via bolts 131; hydraulic cylinder end-cap 115 inserts into outer cylinder end-cap 130, further ensuring that cylinder end-cap 115 remains in position.

In operation, and referring now to FIG. 9, hydraulic fluid is pumped into the area between hydraulic cylinder end-cap 115 and upper hydraulic sleeve 86. The ensuing pressure exerted on the upper surface of sleeve 86 causes rod 47 to move downward to the extended position. Hydraulic fluid is pumped into the area between upper hydraulic sleeve 86 and lower hydraulic sleeve 160 to retract rod 47 when there is no load on ball 80. Hydraulic cylinder stop 128 limits the extension of rod 47. Cylinder 43 slides relative to center rod 47 and inner cylinder 45.

When the motivator pulls the transporter, side loads are transferred from the motivator into main cylinder 40. Upper and lower steel sleeves 100, located between cylinders 43 and 45, cause side loads to be transferred to the transporter via cylinders 43 and 45, without placing side loads on rod sleeve 120. The inner surface 100A of plates 100 is coated with a low friction material, such as Teflon, facilitating the sliding interaction of plates 100 over the outer surface of inner cylinder 45 and the inner surface of cylinder 43. Ball 80 and socket 95 provide for a connection between the motivator and transporter that allows the motivator to freely rotate relative to the transporter without imposing twisting loads on main cylinder 45 or the motivator attachment assembly.

Still referring to FIGS. 8 and 9, while those of skill in the art will realize that beam 33 can be made of various cross-sections, provided it has adequate strength, one preferred configuration is shown. Beam 33 includes a cross-shaped inner section 33A welded to four square steel tubes 33B. Designing the beam in this fashion facilitates the formation and placement of main cylinder 40 through the center of the beam.

Figure 13:
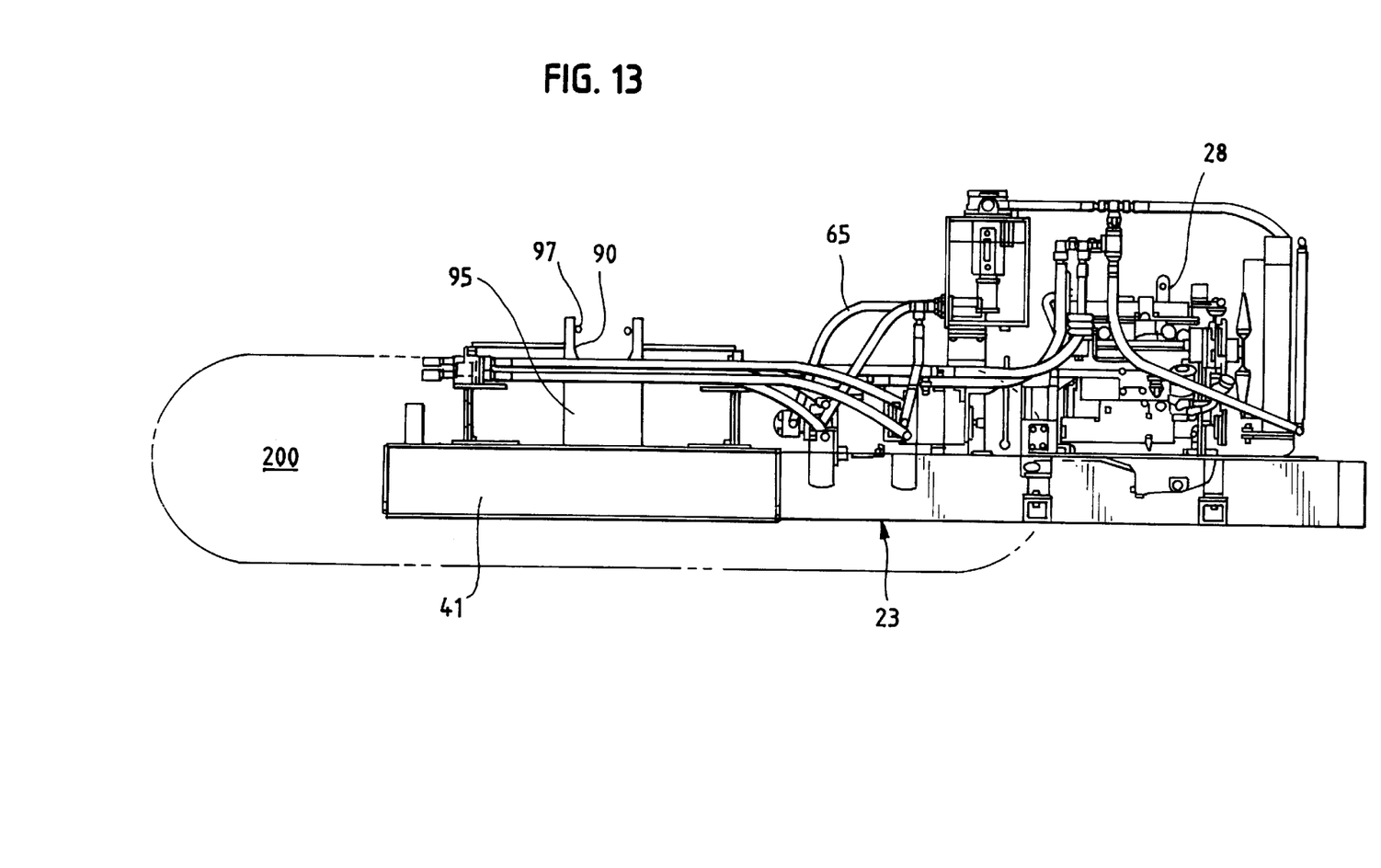
FIG. 13 is a side view of FIG. 12.

Referring now to FIGS. 3, 6, 12 and 13, motivator 20 will now be more particularly described. Initially, it will be understood that any self-powered motivator can be used. However, preferably, a tractor motivator, such as a "Caterpillar"-type tractor (the tractor shown in the drawings is a John Deere tractor that has been modified) employing two endless metal belts or tractor treads 200 is used, of the unique design shown in the drawings. The height of motivator engine 28 is governed by its need to clear the underside of base 33 as the base rotates relative to the motivator during use. A suitable supporting undercarriage 23 is used to mount engine 28, main cylinder 40, and cab 210. Engine 28 is mounted to the tractor in an atypical location at a rearward portion of undercarriage, as shown in FIG. 13. Placement of the hydraulic system and hydraulic lines is arranged accordingly, as best shown in FIGS. 12 and 13.

The use of endless metal belts 200, as opposed to a wheeled carriage (for example) permits the motivator to turn about a generally vertical axis along main cylinder 40 without the need for the motivator to make any initial horizontal movement. This means that no initial horizontal movement of motivator 20 is required in order to change the direction of the transporter. This "zero" or substantially instantaneous turning radius is particularly advantageous when space is constricted, such as in the confined spaces of a shipyard.

The transporter of the preferred embodiment of the present invention, disclosed here, can be used either by a forward, pulling movement of the motivator, or a rearward, pushing movement. Either movement may be desirable or necessary in a given situation.

Transporter 15 operates similar in function to a conventional forklift without the need for a large counterweight to offset the cantilevered forks. This results in the ability to move large loads using a relatively small motivator 20, in a manner that is more flexible and efficient than other known transporters. For example, the design of the present invention permits motivator 20 to move loads of 150 tons or more using an engine that is only about 80 horsepower. Thus, the "horsepower-to-weight" ratio of the transporter of the present invention (where the weight is in tons) can be as low as about 80/150 or 0.5. As another example, for a load of 100 tons, the "horsepower-to-weight" ratio is still less than one. (The speed of the prototype transporter unit varies between about 150 foot/minute, when no load is present, to about 10–12 feet/minute with a heavy load.)

Several additional advantages of the present invention should now be appreciated. The configuration of the support structure permits the use of a "low-profile" support structure in which the upper surfaces of the frame members can be as close as about three feet to the ground, or less, in the lowered position. (In the prototype transporter, there is a 10-inch stroke between upper and lower frame member positions, although lesser or greater stroke lengths may be desirable for different embodiments.) This low-profile capability is particularly advantageous, for example, when joining one large module (such as a ship bow) to another (such as a deckhouse). Also, because base 33 is elevated relative to frame members 30, and tractor engine 28 is forwardly displaced, tractor 20 can be rotated 360-degrees about main cylinder 40 (provided the elevated portions 31 of frame members 30 are sized and spaced accordingly, and corresponding movement of the hydraulic hoses, through a rotary mechanism or otherwise, is permitted), providing a high degree of maneuverability.

The low-profile transporter of the present invention can also be maintained in a substantially level condition, either manually through operator controls, or automatically through computer leveling controls. This feature is referred to as a "height regulating" feature that allows the height of each of the three-point supports of the transporter (the two frame members and the main cylinder) to be independently, vertically adjusted up or down to maintain the load level, as uneven terrain is traversed, or as the need for connection to other structures or placement on a deck or support surface is required.

It will also be appreciated that the present invention can be powered or moved using various alternate vehicles or methods. Main cylinder 40, for example, can be rotatably connected to (an unpowered) wheeled cart, which could be hooked to a cab, truck or other vehicle. Alternatively, main cylinder 40 can be directly mounted to the bed of a truck especially equipped for this purpose. It will be understood that a variety of other powering mechanisms can also be used.

Transporter 15 is also preferably designed to be disassembled for shipment. In one embodiment, beam 33 and cylinder 40 can be designed to be assembled and disassembled (using large bolts, for example) to forks 30. Base 33 and main cylinder 40 can also be designed to be disassembled from motivator 20 in a similar fashion. Pipe 35 can also be designed for disassembly and assembly to the sides of forks 30, as well. In this manner, shipment of transporter 15 can be facilitated.

Those of skill in the art will recognize that the transporter of the present invention can be used in a variety of different ways, and can take different forms, consistent with the spirit of the present invention, while providing use analagous to the function of a forklift picking up and moving off with a "pallet" or other load of material. As a further non-limiting example (in addition to those variants given above), instead of hydraulic actuators to power the regulating movement of the three-point supports, pneumatic actuators, air cylinders, geared motors, or other power actuating mechanisms could be used. The present examples and embodiments, therefore, are to be considered in all respects as illustrative and not restrictive, and the invention is not to be limited to the details given here.

We claim:

1. A low-profile, height-regulating transporter for conveying a load of greater than fifty tons, comprising:

a support structure for supporting and transporting the load, the support structure including at least two longitudinally extending frame members joined at a base, wherein the frame members are adjacent the ground and possess a low profile;

at least one movable carriage associated with each frame member and positioned at a distance from the base, the at least one movable carriage permitting portions of the frame members distanced from the base to be selectively vertically movable between raised and lowered positions during transport of the load;

a powered motivator for moving the transporter in a horizontal direction, one end of the motivator supporting and being rotatably connected to the base, wherein the base can be raised or lowered during transport independent of the vertical movement of the frame members permitted by the at least one movable carriage, thereby allowing the load to be maintained in a substantially level condition during transport;

wherein the motivator has a substantially instantaneous turn radius, and is capable of moving the support structure in any horizontal direction by first rotating the motivator about a generally vertical axis passing through a portion of the motivator; and a main cylinder facilitating rotation of the powered motivator.

2. The transporter of claim 1, wherein each frame member has upper and lower surfaces, and the upper surfaces of each frame member are about three feet or less above ground level when the frame member is in the lowered position.

3. The transporter of claim 1, wherein the transporter is designed to carry loads in excess of 100 tons, and wherein the motivator is powered by a motor of less than about 100 horsepower.

4. The transporter of claim 1, wherein the transporter has a horsepower-to-weight ratio of about 0.5.

5. The transporter of claim 1, wherein the transporter has a horsepower-to-weight ratio of less than about one.

6. The transporter of claim 1, wherein the motivator comprises a tractor with endless metal belts.

7. The transporter of claim 6, wherein the tractor has an engine which is displaced to one end of the tractor generally opposite the end of the tractor that is connected to the base.

8. The transporter of claim 1, further comprising hydraulic actuators associated with the at least one movable carriage for powering the vertical movement of the frame members, relative to the at least one movable carriage, between the raised and lowered positions.

9. The transporter of claim 8, wherein the tractor includes a hydraulic system, and the hydraulic system powers the hydraulic actuators.

10. The transporter of claim 8, further comprising rotatable plates linking the hydraulic actuators to the at least one movable carriage.

11. The transporter of claim 1, wherein the base lies in a generally horizontal plane which is elevated relative to a horizontal plane containing the upper surface of the frame members.

12. The transporter of claim 1, wherein the frame members comprise means for being disassembled from at least portions of the base to facilitate shipment of the transporter.

13. The transporter of claim 1, wherein the base comprises means for being disassembled from its rotatable connection to the motivator to facilitate shipment of the transporter.

14. The transporter of claim 1, wherein the main cylinder comprises an outer cylinder connected to the support structure and an inner cylinder connected to the motivator.

15. The transporter of claim 14, wherein the inner cylinder is attached to the motivator by a spherical, load-bearing ball sitting within a socket, the ball and socket joint allowing the inner cylinder to rotate within the socket about both vertical and horizontal axes.

16. The transporter of claim 15, main cylinder further comprises a center rod, and hydraulic sleeves for retaining hydraulic fluid flowing around the rod, allowing extension and retraction of the rod relative to a load placed upon the load-bearing ball.

17. The transporter of claim 16, wherein the outer cylinder is moveable and slides relative to the center rod and the inner cylinder.

18. The transporter of claim 4, wherein the main cylinder permits the powered motivator to rotate freely relative to the module transporter without imposing destructive twisting loads on either the main cylinder or the motivator.

19. A low profile, height-regulating transporter for conveying loads greater than fifty tons, comprising:

a support structure for supporting and transporting a load, the support structure including at least two longitudinally extending frame members joined at a base, wherein the frame members are adjacent the ground and possess a low profile;

at least one movable carriage associated with each frame member and positioned at a distance from the base, the at least one movable carriage permitting portions of the frame members to be selectively vertically movable between raised and lowered positions during transport of the load;

a powered motivator at least partially supporting the base and rotatably connected to the base at a main cylinder connected to the motivator, wherein the main cylinder facilities rotation of the powered motivator and the base can be raised and lowered independent of the vertical movement of the frame members permitted by the at least one movable carriage, thereby providing a height-regulating support structure which permits the load to be maintained in a substantially level condition during transport;

wherein the motivator is a tractor with endless metal belts, and has a turn radius which is substantially instantaneous and is capable of powering the support structure along a horizontal path, and of steering the support structure by first rotating the motivator about the main cylinder.

20. A regulating transporter for conveying loads of greater than fifty tons, comprising:

a support structure for supporting and transporting a load, the support structure including two longitudinally extending frame members joined at a base;

at least one movable carriage supporting each frame member and positioned at a distance from the base, the at least one movable carriage permitting portions of the frame members to be selectively vertically movable during transport of the load;

a powered motivator at least partially supporting and rotatably connected to the base, wherein the base can be raised and lowered independent of the vertical movement of the frame members permitted by the at least one movable carriage, enabling the support structure to provide a leveling function;

wherein the motivator has a turn radius which is substantially instantaneous and wherein the motivator is capable of powering the support structure along a horizontal path, and the motivator can be rotated relative to the base about a generally vertical axis passing through the connection of the motivator to the base; and a main cylinder facilitating rotation of the powered motivator.

21. The transporter of claim 20, wherein the powered motivator comprises a tractor.

* * * * *